(12) United States Patent
Fowler et al.

(10) Patent No.: US 6,674,626 B2
(45) Date of Patent: Jan. 6, 2004

(54) LIGHTNING SUPPRESSION SYSTEM FOR T1 AND DSL CIRCUITS

(76) Inventors: William J. Fowler, 2162 Gulf Terminal Dr., Houston, TX (US) 77023; Benjamin P. Fowler, 2162 Gulf Terminal, Houston, TX (US) 77023

( * ) Notice: Subject to any disclaimer, the term of this patent is extended or adjusted under 35 U.S.C. 154(b) by 284 days.

(21) Appl. No.: 09/882,431

(22) Filed: Jun. 18, 2001

(65) Prior Publication Data

US 2002/0171990 A1 Nov. 21, 2002

Related U.S. Application Data

(63) Continuation-in-part of application No. 09/855,355, filed on May 15, 2001, now Pat. No. 6,646,854.

(51) Int. Cl.[7] .................................................. H02H 1/00
(52) U.S. Cl. ...................................... 361/119; 361/117
(58) Field of Search ........................ 361/117–119, 212, 361/216, 217, 220; 336/61, 70, 90, 96, 196; 379/443, 457; 333/12, 81 R; 174/1–3, 6, 7, 17 R, 175 F, 25 R, 27, 32, 35 CE, 38, 50.52, 51, 52.1, 52.2, 98, 99 R, 130, DIG. 14, DIG. 17

(56) References Cited

U.S. PATENT DOCUMENTS

| | | | | |
|---|---|---|---|---|
| 3,380,004 A | * | 4/1968 | Hansen | 333/184 |
| 3,824,431 A | * | 7/1974 | Schlicke | 361/126 |
| 5,167,537 A | | 12/1992 | Johnescu et al. | 439/620 |
| 5,587,692 A | * | 12/1996 | Graham et al. | 333/12 |
| 5,844,766 A | | 12/1998 | Miglioli | 361/119 |
| 6,564,051 B2 | * | 5/2003 | Struhsaker et al. | 455/423 |

* cited by examiner

*Primary Examiner*—Ronald W. Leja
(74) *Attorney, Agent, or Firm*—Harrison & Egbert

(57) ABSTRACT

A lightning suppression system including a first wire, a second wire, a third wire, a fourth wire, an enclosure having an interior volume, a first coil connected to the first wire and positioned within the enclosure, a second coil connected to the second wire and positioned within the enclosure, a third coil connected to the third wire and positioned within the enclosure, a fourth coil connected to the fourth wire and positioned within the enclosure, and a piece of electronic equipment interconnected to each of the coils. A conductive grit, such as steel shot, fills a portion of the enclosure around the respective coils. The lightning suppression system is for interconnection to a first twisted pair of wires and a second twisted pair of wires associated with a T1 circuit or a DSL circuit.

17 Claims, 3 Drawing Sheets

LIGHTNING SUPPRESSION SYSTEM FOR T1 AND DSL CIRCUITS

CROSS REFERENCE TO RELATED APPLICATIONS

The present application is a continuation-in-part of U.S. patent application Ser. No. 09/855,355, filed on May 15, 2001, and entitled "LIGHTNING SUPPRESSION ATTENUATOR AND SYSTEM EMPLOYING SAME", presently pending.

BACKGROUND OF THE INVENTION

1. Field of the Invention

The present invention relates to lightning suppression systems. More particularly, the present invention relates to devices for reducing the effect of a lightning strike as it moves along transmitting and receiving wires. More particularly, the present invention relates to devices for protecting electronic equipment associated with T1 or DSL lines.

2. Description of Related Art

Lightning conceivably may have provided humankind with a first source of fire, but lightning has otherwise been a destructive force throughout human history. Strategies and apparatus for reducing the likelihood of damage by lightning are fairly old, including, for instance, lightning rods that have been use for approximately 200 years. While the use of such rods and other precautionary steps and safety devices reduce the damage and injury that would otherwise result from lightning today, it remains an enormously dangerous natural phenomenon that claims hundreds of lives worldwide every year and destroys a substantial amount of property. Somewhat paradoxically, advances in other areas of technology have increased, rather than diminished, the damaged caused by lightning. This is because relatively low voltage and current levels can damage integrated circuits and other modern electronic components, with the result that many electronic devices are more susceptible to lightning damage today than ever before. Many devices to which microprocessors technology has been added are more susceptible to lightning damage as a result of such improvements. Additionally, lightning is capable of inducing substantial currents not only in electrical circuits directly struck by it but also in circuits located within the magnetic field induced by a nearby lightning strikes, giving each strike enormous destructive potential.

One of the most common areas of lightning strikes are large telecommunications and camera towers that extend upwardly from the earth. Typically, such towers include an electronic device at the top which serves to transmit or receive information. Since lightning will follow a path of least resistance on its way to the earth, the towers are very attractive to lightning. It is well known that lightning is particularly attracted to areas of positive ions and is repelled by areas of negative ions. Since the electronic devices at the top of towers often operate on AC power, an attractive source of positive ions is generated at the top of the tower.

A variety of communication technologies are competing to provide high speed access to the home. For example, asymmetric digital subscriber lines (ADSL), cable modems, satellite broadcasts, wireless LANs, and direct fiber connections to the home have all been suggested. Of these technologies, the asymmetric digital subscriber line can utilize the POTS subscriber line (the wire currently being utilized for POTS) between the home user (the residence) and the telephone company (the central office). DSL networks and protocols were developed in the early 1990's to allow telephone companies to provide video-on-demand service over the same wires that were being used to provide POTS. DSL technologies include discrete multitone, carrierless amplitude and phase modulation, high speed DSL and other technologies. DSL technology allows telephone companies to offer high speed internet access and also allows telephone companies to remove internet traffic from the telephone switch network. Typically, a conventional asymmetric DSL system includes a copper twisted pair analog telephone subscriber line, a DSL modem, and a band splitter.

The Bell telephone system in the United States has widely used a digital time-domain multiplexing pulse code modulation system known as the T1 transmission system. Each T1 transmission system carries 24 8-KB/second voice or data channels on two (2) pairs of exchange grade cables. One pair of cables provides communication in each direction. For convenience and simplification of terminology, the pair of cables carrying signals from the central office to the customer premises equipment may be referred to as a "transmit" line, and the pair of cables transmitting data from the customer premises equipment to the central office may be referred to as the "receive" line. These designations are made only as a matter of convenience; when an observer (such as a testing technician) changes position from a central office to a customer premises, what used to be a "transmit" line can become a "receive" line, and what used to be a "receive" line can become a "transmit" line.

In the T1 system, the data to be transmitted over the lines, such as speech, is sampled at a rate of 8,000 Hertz, and the amplitude of each sample is measured. The amplitude of each sample is compared to a scale of discreet values and assigned a numeric value. Each discreet value is then encoded into binary form. Representative binary pulses appear on the transmission lines. The binary form of each sample pulse consists of a combination of seven pulses, or bits. An eighth bit is periodically added to allow for signaling.

In certain circumstances, the cables from the central office to the customer premises can become affected by either a direct strike by lightning or by a ground effective lightning. As a result, the lightning wavefront can travel along the transmit lines and the receive lines so as to affect the communications with the customer. Additionally, the lightning wavefront can travel toward the central office so as to directly affect the transmitter and the electronic equipment associated therewith. As such, a need has developed in order to effectively prevent the affect of such lightning strikes.

In the past, various patents issued on such lightning suppression equipment. For example, U.S. Pat. No. 5,844,766, issued on Dec. 1, 1998 to L. Miglioli, describes a lightning suppression system comprising a directional coupler, a quarter-wavelength stub, a first cylindrical capacitor, a second cylindrical capacitor and a lightning suppression circuit. The lightning suppression circuit suppresses high voltage direct current and low frequency signals such as those produced by near lightning strikes.

U.S. Pat. No. 5,167,537, issued on Dec. 1, 1992 to Johnescu et al., describes a high density MLV contact assembly employing a multi-layered varistor as the transient suppression device. The varistor is mounted in a notch and a sleeve and connected to ground by way of a ground sleeve.

In typical DSL and T1 systems, a suppressor, such as a varistor, is connected between the pairs of cables and the electronic equipment. However, these types of suppressors are usually only effective against minor voltage spikes. They are generally too slow to effectively suppress the effects of a lightning wavefront. When a lightning wavefront passes through the suppressor to the electronic equipment, the high speed telecommunications equipment can cost $20,000 to repair. As such, a need has developed so as to provide an effective lightning suppression attenuator that prevents lightning strikes from affecting the equipment associated with T1 lines and DSL lines.

It is an object of the present invention to provide a lightning suppression system that effectively prevents lightning strikes from affecting the equipment associated with T1 and DSL lines.

It is another object of the present invention to provide a lightning suppression system that will cushion the shock of the lightning wave front from adversely affecting the existing suppressor equipment associated with the T1 and DSL lines.

It is another object of the present invention to provide a lightning suppression system that will minimize the damaging effects of lightning.

It is a further object of the present invention to provide a lightning suppression attenuator which is easy to install, relatively inexpensive and easy to manufacture.

These and other objects and advantages of the present invention will become apparent from a reading of the attached specification and appended claims.

BRIEF SUMMARY OF THE INVENTION

The present invention is a lightning suppression system comprising a first wire, a second wire, a third wire, a fourth wire, and an enclosure having an interior volume, a first coil connected to the first wire and positioned within the enclosure, a second coil connected to the second wire and positioned within the enclosure, a third coil connected to the third wire and positioned within the enclosure, a fourth coil connected to the fourth wire and positioned within the enclosure, and electronic equipment interconnected to the coils. The first and second wires form a first twisted pair. The third wire and fourth wires form a second twisted pair. The first twisted pair is a transmit pair. The second twisted pair is a receive pair.

A transient suppressor is electronically interconnected to each of the coils and to the electronic equipment.

The enclosure has a plurality of terminals formed thereon. Each of the coils has a lead connected to a respective terminal. The electronic equipment has conductive lines respectively interconnected to the plurality of terminals.

A conductive grit fills at least a portion of the enclosure around the coils. In the preferred embodiment of the present invention, the conductive grit is steel shot. A rigid foam material may be affixed within the enclosure around the conductive grit and over the coils. Each of the coils has a central void with turns of wire extending around the central void. In the preferred embodiment of the present invention, each of the coils has between 100 and 500 turns of wire around the central void.

The electronic equipment can be either a computer, a transmitter, a receiver or other equipment associated with DSL circuits or T1 circuits.

DETAILED DESCRIPTION OF THE INVENTION

Figure 1:
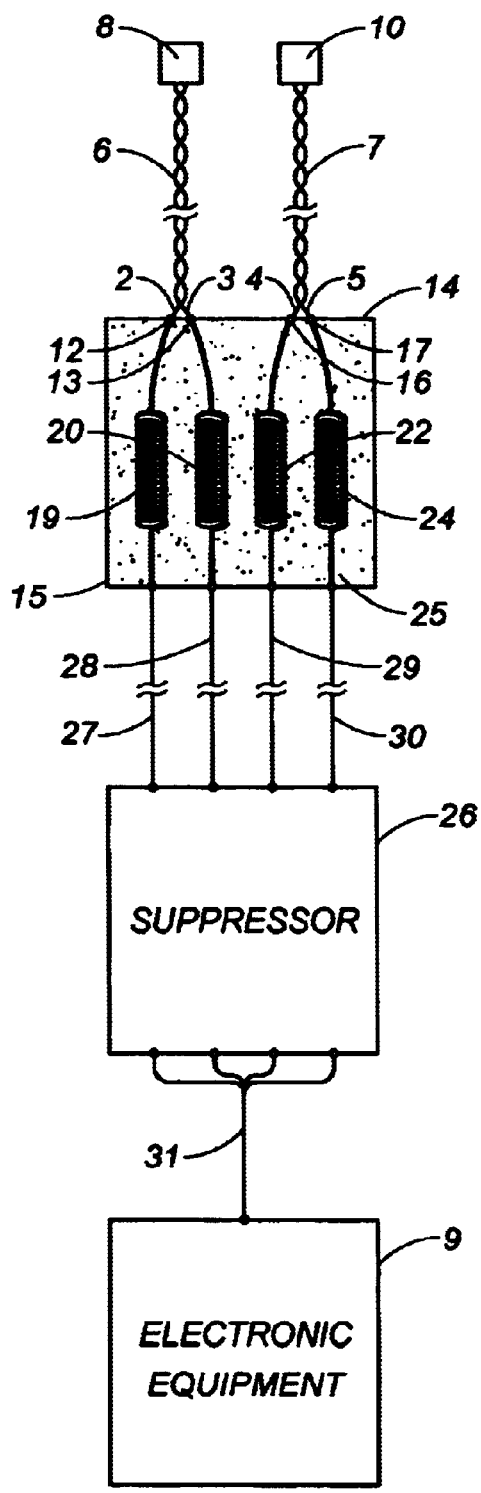
FIG. 1 is a diagrammatic illustration of the lightning suppression system in accordance with teachings of the present invention.

Referring to FIG. 1, there is shown the lightning suppression system 1 in accordance with the teachings of the present invention. The lightning suppression system 1 includes a first wire 2, a second wire 3, a third wire 4 and a fourth wire 5. Wires 2 and 3 are in the form of a twisted pair 6. Wires 4 and 5 are in the form of a twisted pair 7. The first twisted pair 6 serves as a "transmit line from the demark 8 to the electronic equipment 9." The second twisted pair 7 serves as a receive pair from the electronic equipment 9 to the demark 10. As stated earlier, the designation of "receive" and "transmit" can be rather arbitrary with respect to the functions of the twisted pairs 6 and 7.

The lightning suppression attenuator 11 is suitably connected to the wires 2, 3, 4 and 5. Wire 2 is connected to a terminal 12 and wire 3 is connected to a terminal 13 on the wall 14 of the enclosure 15 of the lightning suppression attenuator 11. Similarly, the wire 4 is connected to a terminal 16 and wire 5 is connected to a terminal 17 on wall 14 of the enclosure 15. The wire 2 is electrically connected so as to extend within the interior 16 of the enclosure 15 to a first coil 17. The second wire 3 is electrically connected to a second coil 20. The third wire 4 is electrically connected to a third coil 22. The fourth wire 5 is electrically interconnected to a fourth coil 24. Each of the coils 19, 20, 22 and 24 are positioned in the interior 18 of the enclosure 5 of the lightning suppression attenuator 11. A conductive grit 25 is placed in the interior 18 of the enclosure 15. In normal use, a lightning strike having a wavefront extending through the twisted pair 6 and 7 will pass through the coils 19, 20, 22 and 24 so as to create a counter EMF force in the respective coils. This counter EMF force will dissipate the lightning in the form of heat into the conductive grit 25. As such, this arrangement of coils 19, 20, 22 and 24 within the conductive grit 25 in the enclosure 15 will cause the lightning wavefront to be effectively absorbed such that the effect of the lightning is affectively cushioned upon encountering the suppressor 26.

The suppressor 26 is a conventional spike suppressor that is provided with the electronic equipment 9 associated with the DSL or T1 lines. Typically, the suppressor 26 will be a zener diode which provides low working voltage for the signal and data lines to the electrical devices. The zener diodes limit voltage spikes of especially short duration and sharp wavefront. However, such zener diodes are sufficiently small so as to be properly packaged but lack the handling capacity so as to prevent the lightning wavefront from affecting the electronic equipment 9. The suppressor 26 is connected by respective lines 27, 28, 29 and 30 to the leads from the coils 19, 20, 22, and 24, respectively. The lines 31 from the suppressor 26 are suitably bundled for delivery to the electronic equipment 9. The electronic equipment 9 can be a computer, a transmitter, a receiver, or other forms of equipment that are associated with the production of signals to and from the T1 and DSL circuits.

Figure 2:
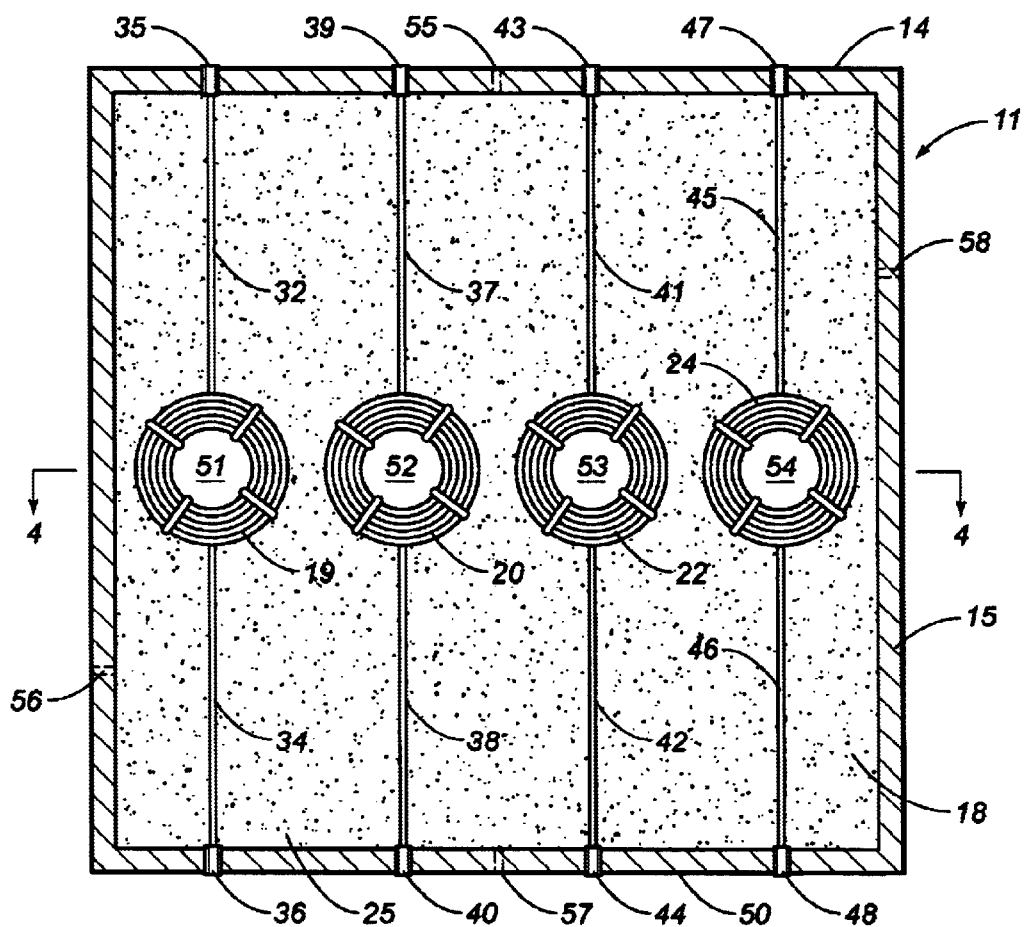
FIG. 2 is a transparent view showing the interior of the lightning suppression attenuator associated with the present invention.

FIG. 2 shows the lightning suppression attenuator 11 in greater detail. The lightning suppression attenuator 11 includes enclosure 15 having interior volume 18. Coils 19, 20, 22 and 24 are received within the interior volume 18 of the enclosure 15. The coil 19 has a first lead 32 and a second lead 34. The first lead 32 connects to terminal 35. The second lead 34 connects to terminal 36. The second coil 20 has a first lead 37 and a second lead 38. The first lead 37 connects to terminal 39. The second lead 38 connects to the terminal 40. The third coil 22 has a first lead 41 and a second lead 42. The first lead 41 connects to terminal 43 and the second lead 42 connects to terminal 44. The first coil 24 has a first lead 45 and a second lead 46. The first lead 45 connects to terminal 47 and the second lead 46 connects to terminal 48. Terminals 35, 39, 43 and 47 are positioned at wall 14 of enclosure 15 so as to be connected to the respective wires 2, 3, 4 and 5. Terminals 36, 40, 44 and 48 extend outwardly of the wall 50 of enclosure 15 so as to be suitably connected to the respective wires 26, 28, 29 and 30.

As can be seen in FIG. 2, the enclosure 15 is a box formed of a polyvinyl chloride (PVC) material. In the preferred embodiment of the present invention, the enclosure 15 is eight inches wide by eight inches long and by four inches deep. A cover will be positioned over the top surface of the enclosure 15. A conductive grit material 25 resides on the bottom of the enclosure 15 within the interior volume 18. The coils 19, 20, 22, and 24 are located within the enclosure and upon the grit 25.

In the present invention, the coils 19, 20, 22 and 24 are coils of CAT 3 cable are CAT 5 cable. Each of the coils 19, 20, 22 and 24 are formed of between 100 and 500 turns of the wire around voids 51, 52, 53 and 54 formed in the center of the respective coils 19, 20, 22 and 24. Cinch straps serve to secure the coils together around the central voids. The cinch straps are provided at even intervals around the circumference of the respective coils. The coils 19, 20, 22 and 24 are dipped in glyptal and dried for 24 hours.

After the coils 19, 20, 22 and 24 are installed upon the layer 25 of the conductive grit, the remainder of the enclosure 15 is filled with another coarse steel grit to within one-half inch of the enclosure 15. As can be seen in FIG. 2, holes 55, 56, 57 and 58 are formed in each of the walls of the enclosure 15. These holes 55,56,57 and 58 allow an expandable foam, such as polyurethane, to be injected into the interior volume 18 so as to expand around the conductive grit within the enclosure 15 and over around the coils 19, 20, 22 and 24. As such, the interior volume 18 can be completely sealed. In the preferred embodiment of the present invention, the conductive grit is steel shot.

Figure 3:
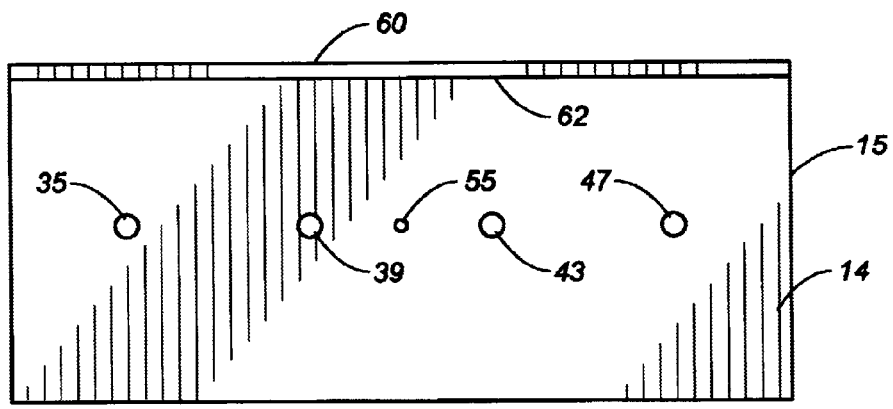
FIG. 3 is an end view of the lightning suppression attenuator associated with the present invention.

FIG. 3 shows an exterior view of the enclosure at end 14. As can be seen, a lid 60 is affixed onto the top opening 62 of the enclosure 15. In particular, the lid 60 can be screwed onto the top 62 of the enclosure 15 so as to securely seal the interior volume 18. The hole 55 allows the expandable foam to be injected into the interior volume 18. Terminals 35, 39, 43 and 47 extend outwardly of the wall 14 of enclosure 15.

Figure 4:
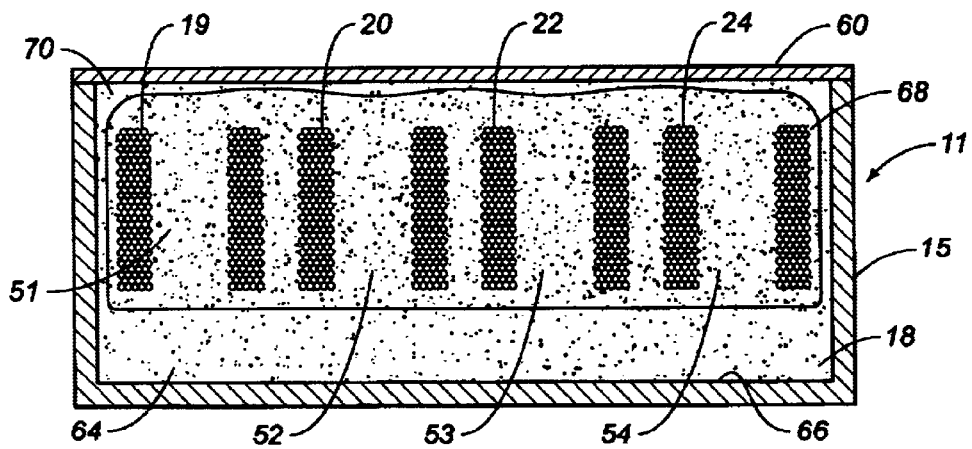
FIG. 4 is a cross-sectional view as taken across lines 4—4 of FIG. 2.

Referring to FIG. 4, the interior configuration of the lightning suppression attenuator 11 is particularly shown. The enclosure 15 has lid 60 affixed thereover. The interior volume 18 includes a first layer 64 of coarse steel grit residing upon the bottom 66 of the enclosure 15. The coils 19, 20, 22 and 24 are placed upon the top of the layer 64. Another layer 68 of coarse steel grit is then placed upon the layer 64 and over and also the coils 19, 20, 22 and 24. The expandable foam material 70 extends around the grit 68 and around the coils 19, 20, 22 and 24 so as to fully seal the coils within the interior volume 18 of the enclosure 15.

In particular, the central voids 51, 52, 53 and 54 associated with the respective coils 19, 20, 22 and 24 are illustrated. It can be seen that the conductive grit material 68 extends into and through such voids.

The configuration of the present invention effectively prevents lightning strikes from adversely affecting the equipment associated with T1 and DSL circuitry. By reducing the effects of a lightning strike from adversely affecting the integrity of the suppressor 26, the present invention maintains the integrity of the electronic equipment 9. The construction of the present invention can be carried out in a very simple and expedient manner.

The foregoing disclosure and description of the invention is illustrative and explanatory thereof. Various changes in the details of the illustrated construction may be made within the scope of the appended claims without departing from the true spirit of the invention. The present invention should only be limited by the following claims and their legal equivalents.

We claim:

1. A lightning suppression system comprising:
   a first wire;
   a second wire;
   a third wire;
   a fourth wire;
   an enclosure having an interior volume;
   a first coil connected to said first wire and positioned within said enclosure;
   a second coil connected to said second wire and positioned within said enclosure;
   a third coil connected to said third wire and positioned within said enclosure;
   a fourth coil connected to said fourth wire and positioned within said enclosure;
   an electronic equipment interconnected to each of said first coil and said second coil and said third coil and said fourth coil; and
   a conductive grit filling a portion of said enclosure, said conductive grit comprising steel shot.

2. The system of claim 1, said first wire and said second wire forming a first twisted pair; said third wire and said fourth wire forming a second twisted pair, said first twisted pair being a transmit wire pair, said second twisted pair being a receive wire pair.

3. The system of claim 1, further comprising:
   a transient suppressor interconnected to each of said coils and said electronic equipment.

4. The system of claim 1, said enclosure having a plurality of terminals formed therein, each of said coils having a lead connected to a respective terminal, said electronic equipment having conductive lines respectively interconnected to said plurality of terminals.

5. The system of claim 1, each of said coils having a central void with turns of wire extending around said central void.

6. The system of claim 5, each of said coils having between 100 to 500 turns of wire around said central void.

7. The system of claim 1, said electronic equipment being a computer.

8. The system of claim 1, said electronic equipment being a transmitter.

9. The system of claim 1, said electronic equipment being a receiver.

10. The system of claim 1, each of said wires being connected to a DSL circuit.

11. The system of claim 1, each of said wires being connected to a T1 circuit.

12. A lightning suppression system comprising:
   a first wire;
   a second wire;
   a third wire;
   a fourth wire;
   an enclosure having an interior volume;
   a first coil connected to said first wire and positioned within said enclosure;
   a second coil connected to said second wire and positioned within said enclosure;
   a third coil connected to said third wire and positioned within said enclosure;
   a fourth coil connected to said fourth wire and positioned within said enclosure;
   an electronic equipment interconnected to each of said first coil and said second coil and said third coil and said fourth coil;
   a conductive grit filling a portion of said enclosure; and
   a rigid foam material affixed within said enclosure around said conductive grit and over said coils.

13. The system of claim 12, said conductive grit comprising steel shot.

14. A lightning suppression attenuator for a T1 or a DSL circuit comprising:
   an enclosure having an interior volume;
   a first coil having a first terminal and a second terminal at opposite ends thereof;
   a second coil having a first terminal and a second terminal at opposite ends thereof;
   a third coil having a first terminal and a second terminal at opposite ends thereof;
   a fourth coil having a first terminal and a second terminal at opposite ends thereof, said coils being positioned within said interior volume of said housing; and
   a conductive grit filling at least a portion of said enclosure, said conductive grit being steel shot.

15. The attenuator of claim 14, each of said coils having between 100 and 500 turns of wire inclusive.

16. The attenuator of claim 15, each of said coils being of CAT 3 cable.

17. The attenuator of claim 15, each of said coils being of CAT 5 cable.

* * * * *